(12) United States Patent
Hashimoto

(10) Patent No.: US 8,817,390 B2
(45) Date of Patent: Aug. 26, 2014

(54) IMAGE PICKUP LENS

(71) Applicant: Kantatsu Co., Ltd., Yaita (JP)

(72) Inventor: Masaya Hashimoto, Sukagawa (JP)

(73) Assignee: Kantatsu Co., Ltd., Yaita-shi (JP)

( * ) Notice: Subject to any disclaimer, the term of this patent is extended or adjusted under 35 U.S.C. 154(b) by 32 days.

(21) Appl. No.: 13/748,319

(22) Filed: Jan. 23, 2013

(65) Prior Publication Data

US 2013/0188264 A1 Jul. 25, 2013

(30) Foreign Application Priority Data

Jan. 23, 2012 (JP) ................. 2012-011272

(51) Int. Cl.
*G02B 13/18* (2006.01)
*G02B 9/34* (2006.01)
*G02B 13/00* (2006.01)

(52) U.S. Cl.
CPC ............... *G02B 9/34* (2013.01); *G02B 13/004* (2013.01)
USPC .......................................... 359/715; 359/773

(58) Field of Classification Search
CPC ......... G02B 13/004; G02B 13/18; G02B 9/34
USPC .......................................... 359/715, 771, 773
See application file for complete search history.

(56) References Cited

U.S. PATENT DOCUMENTS

2011/0228409 A1\* 9/2011 Uchida .................... 359/715

FOREIGN PATENT DOCUMENTS

| JP | 2007-286153 A | 11/2007 |
| JP | 2008-46526 A | 2/2008 |
| JP | 2008-242180 A | 10/2008 |
| JP | 2009-14899 A | 1/2009 |

\* cited by examiner

*Primary Examiner* — David N Spector
(74) *Attorney, Agent, or Firm* — Westerman, Hattori, Daniels & Adrian, LLP

(57) ABSTRACT

An image pickup lens having a relatively wide angle of field with various aberrations preferably corrected and having a small F-value is achieved. The image pickup lens is composed of, in order from an object side, an aperture stop, a first lens of a biconvex shape having a refractive power, a second lens of a meniscus shape having a negative refractive power with a concave surface facing the object side near the optical axis, a third lens of a meniscus shape having a positive refractive power with a concave surface facing the object side near the optical axis, and a fourth lens of a biconcave shape having a negative refractive power near the optical axis, wherein the image pickup lens satisfies a following conditional expression (1):

$$0.6 < f1/f < 0.8 \qquad (1)$$

where f1 represents a focal length of the first lens, and f represents a focal length of the overall image pickup lens.

6 Claims, 12 Drawing Sheets

IMAGE PICKUP LENS

The present application is based on and claims priority of Japanese patent application No. 2012-011272 filed on Jan. 23, 2012, the entire contents of which are hereby incorporated by reference.

BACKGROUND OF THE INVENTION

1. Field of the Invention

The present invention relates to an image pickup lens for forming an image of an object on a solid-state imaging element such as a CCD sensor, a C-MOS sensor and the like used in a small-sized imaging device, and especially relates to an image pickup lens built into an imaging device mounted on a portable terminal such as a cellular phone or a smartphone, a PDA (Personal Digital Assistance), a game machine, an information terminal such as a personal computer, where downsizing and thinning are pursued.

2. Description of the Related Art

Recently, the market for portable terminals having imaging devices is increasingly expanding. Most portable terminals are equipped with a camera function, and currently, a majority of such camera function has a large number of pixels comparable to that of digital cameras. Along with the increasing demands for thinning of portable terminals from viewpoint of user-friendliness and design, demands for downsizing and thinning of the imaging devices built therein are also becoming severe. Further, regarding an image pickup lens mounted on a camera for taking a picture of oneself called an in-camera or a sub-camera in a portable terminal, a major type of the lens has an increased number of pixels exceeding 1 mega pixels, greater than the conventional VGA-class lens. The image pickup lens adopted in the imaging device using imaging elements having such increased number of pixels must have even higher resolution, be downsized and thinned, and have a small F value. At the same time, there is a strong demand for the lens to cope with a wider angle of field which enables the camera to take an image of an object in a wide area.

Generally, the image pickup lens answering to such trend of downsizing, thinning and enhanced performance is composed of multiple lenses. In the prior art, image pickup lenses having a two-lens configuration or a three-lens configuration have been adopted widely to realize a VGA class to one-megapixel-class lens, because they are advantageous from the viewpoint of size and cost. However, in order to cope with further downsizing and increase in the number of pixels, many image pickup lenses having a four-lens configuration capable of realizing a higher performance than the three-lens configuration have been proposed.

For example, Japanese Patent Laid-Open No. 2007-286153 (Patent Document 1) discloses an image pickup lens composed of, in order from an object side, an aperture stop, a first lens having a positive refractive power, a second lens having a negative refractive power with a concave surface facing an image side, a third lens having a positive refractive power, and a fourth lens having a negative refractive power with a concave surface facing the image side, wherein a value of a curvature radius of an image side surface of the second lens with respect to a focal length of the overall optical system is set to fall within an appropriate range with the aim to realize high performance.

Further, Japanese Patent Laid-Open No. 2008-046526 (Patent Document 2) discloses an image pickup lens composed of, in order from an object side, an aperture stop, a first lens having a positive refractive power, a second lens having a negative refractive power, a third lens having a positive refractive power, and a fourth lens having a negative refractive power with a concave surface facing the object side in which at least one side is formed as an aspheric surface, wherein a power of the first lens and the relationship of a curvature radius of an object side surface and an image side surface of the fourth lens are set to fall within an appropriate range with the aim to realize high performance.

Furthermore, Japanese Patent Laid-Open No. 2008-242180 (Patent Document 3) discloses an image pickup lens composed of, in order from an object side, an aperture stop, a first lens having a positive refractive power, a second lens having a negative refractive power, a third lens having a positive refractive power, and a fourth lens having a negative refractive power adopting a biconcave configuration and having at least one surface formed as an aspheric surface, wherein a ratio of a focal length of the overall optical system to a focal length of the first lens and to a focal length of the third lens is set to fall within an appropriate range with the aim to realize high performance.

Moreover, Japanese Patent Laid-Open No. 2009-014899 (Patent Document 4) discloses an image pickup lens composed of, in order from an object side, a stop, a first lens having a positive power with a biconvex shape, a second lens having a negative power with a meniscus shape and having a convex surface facing the object side, a third lens having a positive power with a meniscus shape and having a convex surface facing the image side, and a fourth lens having a negative power with a meniscus shape and having a convex surface facing the object side, wherein a relationship between a center thickness of the first lens and a focal length of the first lens and an Abbe number of the second lens and the third lens are set to fall within an appropriate range with the aim to realize high performance.

According to the image pickup lenses disclosed in Patent Documents 1, 2 and 3, a ratio (TTL/2IH) of a total track length (TTL) to a maximum image height (IH) is approximately 1.0, so that downsizing of the lens is comparatively realized. However, the half angle of field of the lens is 30 to 31°, which is insufficient for answering to the demand of wider angle of field. In addition, the F value of the lenses is between 2.88 and 3.29, which cannot be recognized as ensuring brightness sufficient for imaging elements having increased number of pixels. According to the image pickup lens taught in Patent Document 4, downsizing is also comparatively realized, but the F value thereof is 3.2, which means that sufficient brightness is not achieved. As described, it was not possible according to the prior art lenses to answer to the demands of downsizing, wider angle of field and small F value at the same time.

SUMMARY OF THE INVENTION

The present invention aims at solving the above-mentioned problems of the prior art, by providing an image pickup lens which realizes downsizing and thinning, has a small F value, with various aberrations corrected satisfactorily, has a relatively wide angle of field, and can cope with cost reduction.

The image pickup lens of the present invention is composed of, in order from an object side to an image plane side: an aperture stop; a first lens of a biconvex shape having a positive refractive power with convex surfaces facing both the object side and the image side near an optical axis; a second lens of a meniscus shape having a negative refractive power with a concave surface facing the object side near the optical axis; a third lens of a meniscus shape having a positive refractive power with a concave surface facing the object side near the optical axis; and a fourth lens of a biconcave shape having a negative refractive power with concave surfaces facing both the object side and the image side near the optical axis; wherein the image pickup lens satisfies a following conditional expression (1):

$$0.6 < f1/f < 0.8 \qquad (1)$$

where f1 represents a focal length of the first lens, and f represents a focal length of the overall image pickup lens.

According to the above configuration, the object side surface of the second lens having a concave surface faces the convex surface on the image side of the first lens, the object side surface of the third lens having a concave surface faces the convex surface of the second lens on the image side, and the object side surface of the fourth lens having a concave surface faces the convex surface on the image side of the third lens, in other words, the convex surfaces on the image side and the concave surfaces on the object side are respectively arranged to face one another. Further, the concave surfaces respectively formed on the object side of the second lens, the third lens and the fourth lens are formed as aspheric surfaces having no pole-change point except on an optical axis. As described, by having the convex surfaces on the image side face the concave surfaces on the object side with no pole-change point, it makes enable to minimize the distance between the respective lenses. That is, since the surface configuration of the present invention enables to realize a short total track length, consequently downsizing and thinning of the image pickup lens being achievable. (In the present description, the term pole-change point refers to a point on an aspheric surface where a tangent plane perpendicularly crosses an optical axis.) The configuration where the convex surfaces on the image side face the concave surfaces on the object side enables an angle of deviation of rays exiting the convex surfaces and passing through the concave surfaces to be relatively small, so that eccentricity sensitivity among lenses being suppressed and enables fabrication to be facilitated.

On the other hand, a focal length of the overall optical system must be set to a small value for achieving a wide angle of field, but if the focal length is too small, a problem occurs in which an appropriate back focus cannot be ensured. The configuration of the present invention enables to ensure an appropriate back focus capable of realizing a wide angle of field while setting the focal length to a favorably small level. Especially since the second lens takes a meniscus shape with a concave surface facing the object side, a principal point on the image side of the second lens can be moved toward the object side, so that back focus can be ensured easily.

Moreover, an exit pupil position can be arranged away from the image plane by having the aperture stop positioned closest to the object side, so that the angle of entrance of rays to imaging elements can be suppressed and a favorable image-side telecentric property can be ensured.

Conditional expression (1) defines a ratio of the power of the first lens with respect to the power of the overall optical system. If the ratio exceeds the maximum value of conditional expression (1), the total track length becomes long, so that back focus can be easily ensured, but downsizing becomes difficult and a wide angle of field becomes hard to achieve. On the other hand, if the ratio falls below the minimum value, downsizing can be easily achieved, but the positive power of the first lens with respect to the power of the overall optical system becomes too strong, so that it becomes difficult to suppress high-order spherical aberration and coma aberration.

Regarding conditional expression (1), it is further preferable to achieve within the following range.

$$0.64 < f1/f < 0.75 \qquad (1a)$$

Furthermore, the image pickup lens having the above-described configuration is preferably to be satisfied by following conditional expressions (2) and (3):

$$f3 < f1 \qquad (2)$$

$$0.9 < f3/|f4| < 1.10 \qquad (3)$$

where f3 represents a focal length of the third lens, and f4 represents a focal length of the fourth lens.

Conditional expression (2) defines the relationship between the power of the first lens and the power of the third lens, which is a condition for realizing downsizing. By setting the positive power of the third lens greater than that of the first lens, further downsizing will be achieved.

Further, conditional expression (3) defines the relationship between the power of the third lens and the power of the fourth lens. By satisfying conditional expression (2), the third lens will have the strongest positive power out of the two lenses having the positive power constituting the optical system. However, if the third lens is simply set to have a strong power, axial chromatic aberration, chromatic aberration of magnification, and field curvature tend to deteriorate. Therefore, by satisfying the conditional expression (3), it becomes possible to cancel out the various aberrations occurring in the third lens by the negative power of the fourth lens. In other words, the meaning of the range of conditional expression (3) is, the negative power of the fourth lens and the positive power of the third lens to be set at an equivalent level, and as long as the power of the third and fourth lenses defined within the range, the chromatic aberration and the field curvature can be corrected preferably even if the positive power of the third lens is set to be stronger than the positive power of the first lens. Accordingly, by simultaneously satisfying both conditional expressions (2) and (3), further downsizing and preferable correction of aberration will be realized.

Further, the image pickup lens having the above configuration is preferably to be satisfied by the following conditional expression (4):

$$0.7 < |f2|/f < 1.2 \qquad (4)$$

where f2 represents a focal length of the second lens.

The conditional expression (4) defines the negative power of the second lens with respect to the power of the overall optical system, which is a condition for suppressing the angle of incidence of rays to imaging elements while maintaining an appropriate back focus.

If the power exceeds the upper limit of conditional expression (4), it becomes difficult to suppress axial chromatic aberration, and the overall length becomes too short because the positive power within the image pickup lens becomes too strong, so that it becomes difficult to control the angle of incidence of rays to the imaging elements.

On the other hand, if the power falls below the lower limit of conditional expression (4), the negative power within the image pickup lens becomes strong, resulted in advantageous for ensuring back focus, but difficult to achieve downsizing.

Further, the image pickup lens having the above configuration is preferably to be satisfied by the following conditional expression (5):

$$0.28 < Bf/TTL < 0.35 \qquad (5)$$

where Bf represents a distance on an optical axis from an image side surface of the fourth lens to the image plane (distance calculated through air), and TTL represents a distance on an optical axis from an object side surface of the first lens to the image plane (distance calculated through air).

The conditional expression (5) is a condition for ensuring an appropriate back focus. If the back focus exceeds the upper limit of conditional expression (5), back focus becomes too long, and it results to be difficult to achieve downsizing. On the other hand, if the back focus falls below the lower limit of conditional expression (5), it results in achievable downsizing easily, but the back focus becomes too short, and it becomes difficult to ensure space for arranging an IR cut filter, a cover glass and the others. The Bf and TTL distances are calculated through air in the state having removed the IR cut filter, the cover glass and the others.

Further, the image pickup lens having the above configuration is preferably to be satisfied by the following conditional expression (6):

$$0.7 < IH/f < 0.80 \qquad (6)$$

where IH represents a maximum image height.

The conditional expression (6) defines a rate of a maximum image height to the focal length of the overall optical system of the image pickup lens, which is a condition for achieving a relatively wide angle of field.

Further, the lens according to the present invention, by setting the focal length of the overall optical system and the maximum image height to fall within the range of aforementioned rate, it enables to realize both a wide angle of field and a favorable image quality with no failure.

Further, the image pickup lens having the above configuration can correct various aberrations successfully by forming all surfaces as aspheric surfaces. In addition, it is preferable that the aspheric surface of the fourth lens on the image side is formed as a concave surface near the optical axis, and has a pole-change point at a position except on the optical axis. By designing the aspheric surface to have such configuration, it becomes possible to appropriately suppress the angle of incidence of rays entering the imaging elements and to enhance telecentric properties.

Further, all the lenses composing the image pickup lens according to the present invention are preferably to be formed of plastic material. By using plastic material for the lenses, the degree of freedom for favorably correcting various aberrations is increased. Further, due to mass production enabled by mold injection, cost reduction is facilitated.

Further, the image pickup lens according to the present invention is preferably to be satisfied by the following conditional expression (7).

$$2.2 < f/EP < 2.5 \qquad (7)$$

where EP represents a diameter of an entrance pupil.

The conditional expression (7) defines the brightness of the image pickup lens. By designing the lens to fall within the range of conditional expression (7), it becomes possible to achieve a bright lens system applicable to the recent high pixel imaging elements.

DETAILED DESCRIPTION OF THE PREFERRED EMBODIMENTS

Now, preferred embodiments of the present invention will be explained in detail with reference to the drawings.

FIG. 1, FIG. 3, FIG. 5, FIG. 7, FIG. 9 and FIG. 11 respectively are general configuration diagrams of Embodiments 1 through 6 of the present invention. The basic lens configuration is identical in all embodiments, therefore, it is explained to the image pickup lens configuration of the present embodiment with reference to the general configuration diagram of Embodiment 1.

Figure 1:
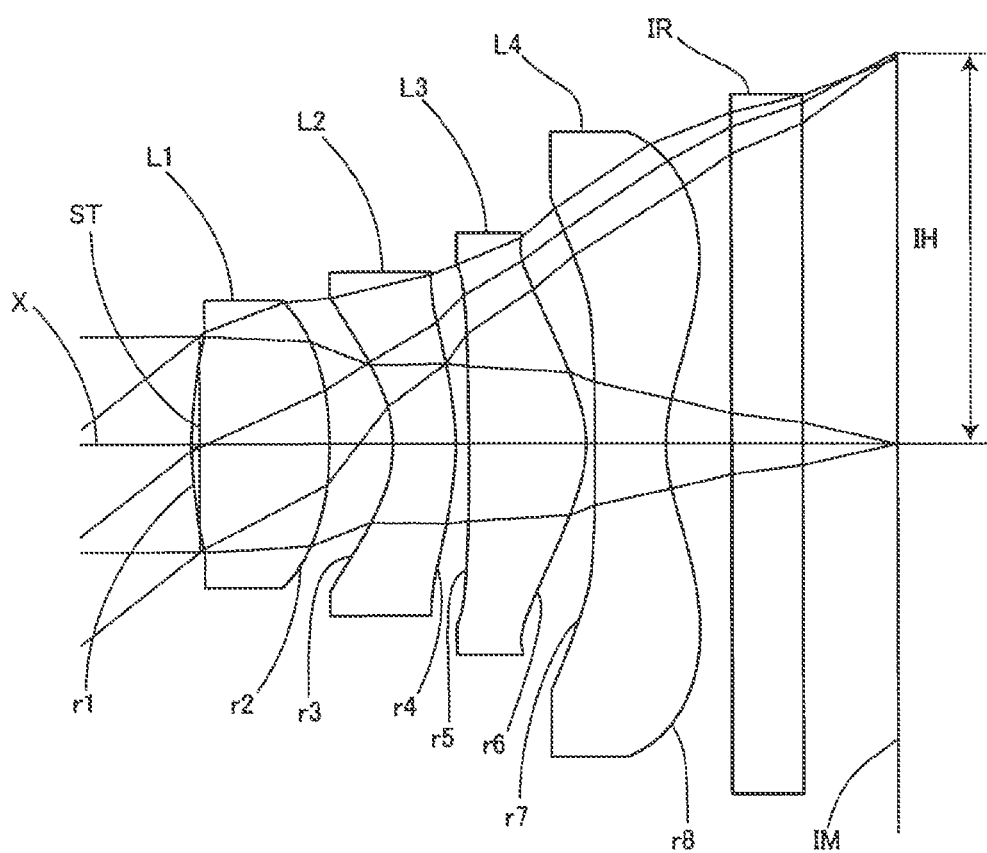
FIG. 1 is a diagram showing a general configuration of an image pickup lens according to Embodiment 1.

As is shown in FIG. 1, an image pickup lens of the present embodiment is composed of, in order from an object side to an image plane side, an aperture stop ST, a first lens L1 having a positive refractive power, a second lens L2 having a negative refractive power, a third lens L3 having a positive refractive power, and a fourth lens L4 having a negative refractive power. A filter IR is arranged between the fourth lens L4 and an image plane IM. It can be chosen an option the filter IR not to be placed.

In the image pickup lens having the above-mentioned configuration, the first lens L1 is a biconvex lens with both an object side surface r1 and an image side surface r2 being a convex surface near an optical axis X, the second lens L2 is a meniscus lens with an object side surface r3 of a concave surface and an image side surface r4 of a convex surface near the optical axis X, the third lens L3 is a meniscus lens with an object side surface r5 of a concave surface and an image side surface r6 of a convex surface near the optical axis X, and the fourth lens L4 is a biconcave lens with both an object side surface r7 and an image side surface r8 being a concave surface near the optical axis X.

According to the above configuration, the convex surface r2 the image side of the first lens L1 faces the concave surface r3 the object side of the second lens L2, the convex surface r4 the image side of the second lens L2 faces the concave surface r5 the object side surface of the third lens L3 and the convex surface r6 on the image side of the third lens L3 faces the concave surface r7 the object side surface of the fourth lens L4, in other words, the convex surfaces on the image side and the concave surfaces on the object side are respectively arranged to face one another. Further, all lens surfaces are formed of aspheric surfaces, wherein the respective object-side concave surfaces r3, r5 and r7 of the second lens L2, the third lens L3 and the fourth lens L4 are formed of aspheric surfaces having no pole-change point or inflection point except on the optical axis. (In the present description, a pole-change point refers to a point on the aspheric surface where the tangent plane perpendicularly meets the optical axis, and inflection point refers to a point on the aspheric surface where the direction of the radius of curvature is inverted).

As described, in the present embodiment, the rays exiting the respective image-side convex surfaces of the first lens L1, the second lens L2 and the third lens L3 enter the concave surfaces. Such surface arrangement enables to minimize the interval distances between the lenses. Especially, both the second lens L2 and the third lens L3 take a meniscus shape in which the object-side surfaces are concave surfaces, so that the lens configuration can be downsized by arranging the second lens L2 and the third lens L3 with a short distance therebetween. Further, narrowing of the distance between lenses enables the optical path length to be shortened, which works advantageously in reducing the error sensitivity caused by the eccentricity of the lenses.

The terms downsizing and thinning refer to a ratio of a total track length (TTL) with respect to a diagonal length (2IH) of the imaging surface of imaging elements (TTL/(2IH)) being at a level of 1.0 or smaller.

Furthermore, by setting the positive composite power composed of a positive first lens L1 and a negative second lens L2 to a value not greater than necessary, it becomes possible to suppress the occurrence of a high-order spherical aberration or coma aberration while maintaining a downsized design, and by setting the positive third lens L3 and a negative fourth lens L4 to have an appropriate balanced power, it becomes possible to suppress the occurrence of various aberrations.

The aperture stop ST is arranged between a vertex position of the convex surface on the object side of the first lens L1 and a circumferential edge portion on the object side of the first lens L1, but the position is not limited to this area. For example, the aperture stop ST can be arranged closer to the object side than the vertex position of the convex surface on the object side of the first lens L1, or can be arranged at the end of the effective diameter of the convex surface on the object side of the first lens L1. By arranging the aperture stop ST close to the object side of the first lens L1, it enables to arrange the position of an exit pupil away from the image plane and enhance telecentric properties.

Further, the image side surface of the fourth lens L4 is formed as a concave surface near an optical axis X but changes into a convex surface at areas distant from the optical axis X, in other words, the surface is formed as an aspheric surface having a pole-change point except on the optical axis X. As described, by setting a pole-change point at the circumferential position of the image side surface of the fourth lens closest to the image plane, the negative power at the center changes into a positive power as the lens approximates to the circumference, it enables the angle of the off-axis incoming rays on the circumference of the imaging elements can be controlled appropriately.

Furthermore, all the image pickup lenses of the present embodiments adopt plastic materials. In Embodiments 1 through 5, the first lens L1, the third lens L3 and the fourth lens L4 are formed of cycloolefin polymer, and the second lens L2 is formed of polycarbonate.

In Embodiment 6, the first lens L1 and the fourth lens L4 are formed of cycloolefin polymer, the second lens L2 is formed of polycarbonate, and the third lens L3 is formed of cycloolefin copolymer.

By adopting plastic materials for all the lenses, it becomes possible to realize stable mass production and facilitate cost reduction.

The image pickup lens according to the present invention satisfies the following conditional expressions.

$$0.6 < f1/f < 0.8 \quad (1)$$

$$f3 < f1 \quad (2)$$

$$0.9 < |f3/f4| < 1.10 \quad (3)$$

$$0.7 < |f2|/f < 1.2 \quad (4)$$

$$0.28 < Bf/TTL < 0.35 \quad (5)$$

$$0.7 < IH/f < 0.80 \quad (6)$$

$$2.2 < f/EP < 2.5 \quad (7)$$

where
f: focal length of the overall optical system of the image pickup lens
f1: focal length of the first lens
f2: focal length of the second lens
f3: focal length of the third lens
f4: focal length of the fourth lens
Bf: distance on the optical axis from the image side surface of the fourth lens to the image plane (distance calculated through air)
TTL: distance on the optical axis from the object side surface of the first lens to the image plane (distance calculated through air)
IH: maximum image height
EP: entrance pupil diameter In the present embodiment, the lens surfaces of all lenses are formed of aspheric surfaces. The aspheric shape adopted in these lens surfaces is represented by the following expression, when an axis in the optical axis direction is denoted as Z, a height in a direction orthogonal to the optical axis is H, a constant of the cone is k, and aspheric coefficients are A4, A6, A8, A10, A12, A14, and A16.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the image pickup lens according to the present embodiments are shown. In each embodiment, f represents an overall focal length of the image pickup lens system, Fno represents an F number, and ω represents a half angle of field. Further, i represents a surface number counted from the object side, r represents a curvature radius, d represents a distance between lens surfaces on the optical axis (surface distance), Nd represents a refractive index with respect to d-ray (reference wavelength), and vd represents an Abbe number with respect to d-ray. Aspheric surface will be represented with a sign * (asterisk) after the surface number i.

Embodiment 1

Basic lens data will be shown in Table 1 below.

TABLE 1

Embodiment 1
Unit mm
f = 2.143
Fno = 2.408
ω = 36.91°

Surface data

| Surface No. i | Curvature radius r | Surface distance d | Refractive index Nd | Abbe No. vd |
|---|---|---|---|---|
| (Object surface) | Infinity | Infinity | | |
| Stop | Infinity | −0.034 | | |
| 1* | 1.4685 | 0.586 | 1.534622 | 56.1603 |
| 2* | −1.4872 | 0.268 | | |
| 3* | −0.5655 | 0.27 | 1.635489 | 23.9114 |
| 4* | −1.2411 | 0.054 | | |

TABLE 1-continued

Embodiment 1
Unit mm
f = 2.143
Fno = 2.408
ω = 36.91°

| | | | | |
|---|---|---|---|---|
| 5* | −8.7135 | 0.4988 | 1.534622 | 56.1603 |
| 6* | −0.5154 | 0.0381 | | |
| 7* | −106.5454 | 0.3 | 1.534622 | 56.1603 |
| 8* | 0.5687 | 0.28 | | |
| 9 | Infinity | 0.3 | 1.514798 | 54.1983 |
| 10 | Infinity | 0.4244 | | |
| Image Plane | Infinity | | | |

Single lens data

| Lens | Start surface | Focal length |
|---|---|---|
| 1 | 1 | 1.4789 |
| 2 | 3 | −1.9222 |
| 3 | 5 | 0.9992 |
| 4 | 7 | −1.0528 |

Aspheric data

| | First surface | Second surface | Third surface | Fourth surface |
|---|---|---|---|---|
| k | 0 | −26.3 | −0.311 | −1.63 |
| A4 | −2.179E−01 | −1.304E+00 | 6.668E−01 | 8.918E−03 |
| A6 | −7.746E−01 | 1.496E+00 | −2.500E+00 | 2.435E+00 |
| A8 | 2.453E+00 | −1.059E+00 | 3.525E+01 | −1.255E+01 |
| A10 | −1.367E+01 | −3.647E+00 | −1.084E+02 | 4.448E+01 |
| A12 | 0.000E+00 | 1.447E+00 | 1.227E+02 | −7.945E+01 |
| A14 | 0.000E+00 | 0.000E+00 | 0.000E+00 | 5.302E+01 |
| A16 | 0.000E+00 | 0.000E+00 | 0.000E+00 | 0.000E+00 |

| | Fifth surface | Sixth surface | Seventh surface | Eighth surface |
|---|---|---|---|---|
| k | 0 | −4.8 | 0 | −6.7 |
| A4 | −1.262E−01 | −4.535E−01 | −1.093E−01 | −4.872E−01 |
| A6 | 2.018E+00 | 2.619E+00 | −6.658E−01 | 9.329E−01 |
| A8 | −1.029E+01 | −7.665E+00 | 1.092E+00 | −1.806E+00 |
| A10 | 2.359E+01 | 1.211E+01 | −5.954E−01 | 2.293E+00 |
| A12 | −2.444E+01 | −7.822E+00 | 1.011E−01 | −1.749E+00 |
| A14 | 7.624E+00 | 3.970E−01 | 0.000E+00 | 7.210E−01 |
| A16 | 0.000E+00 | 9.976E−01 | 0.000E+00 | −1.244E−01 |

The image pickup lens according to Embodiment 1 satisfies all conditional expressions (1) through (7), as shown in Table 7.

Figure 2:
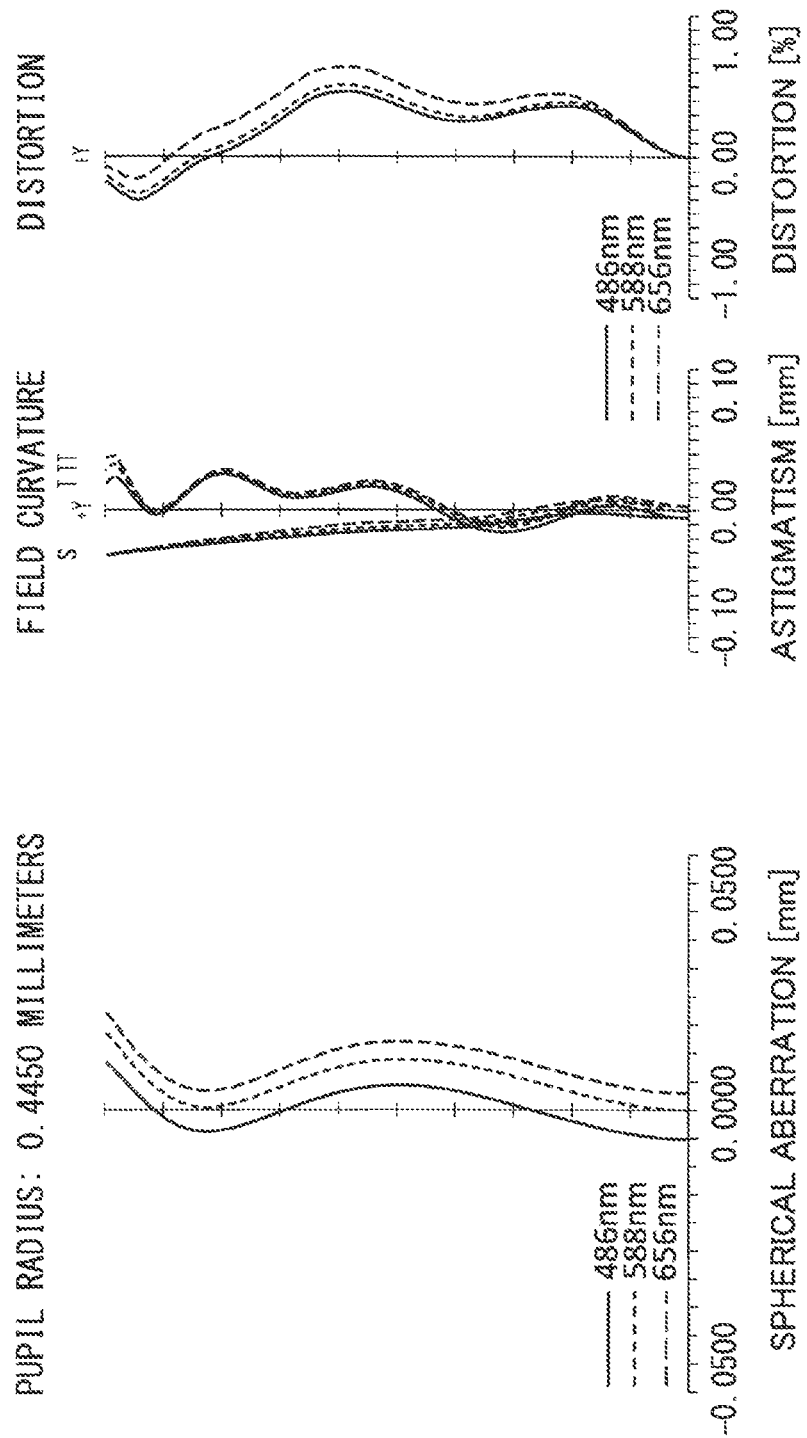
FIG. 2 is a view showing a spherical aberration, astigmatism, and a distortion of the image pickup lens according to Embodiment 1.
Figure 3:
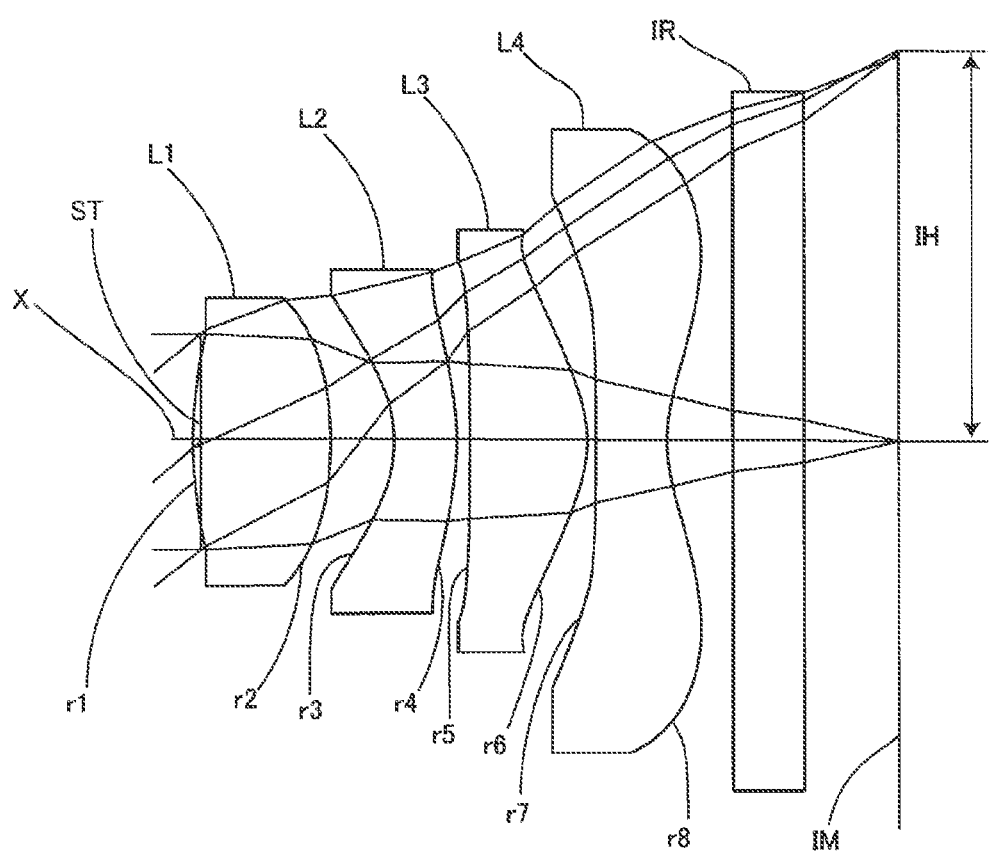
FIG. 3 is a view showing a general configuration of the image pickup lens according to Embodiment 2.

FIG. 2 shows a spherical aberration (mm), astigmatism (mm), and a distortion (%) of the image pickup lens according to Embodiment 1. These aberration diagrams illustrate the amount of aberration with respect to the respective wavelengths of F-ray (486 nm), d-ray (588 nm) and C-ray (656 nm). Further, the astigmatism diagram illustrates the respective amounts of aberration on a sagittal image surface S and a tangential image surface T. As shown in FIG. 2, it is observed that the respective aberrations are satisfactorily corrected.

Further, a ratio (TTL/2IH) of the total track length TTL to the maximum image height IH is 0.898, enabled realizing the downsizing. Moreover, while a half angle of field of the lens is 36.91°, a relatively wide angle of field, achieved a small distortion image, the maximum value of approximately 0.5%.

Embodiment 2

Basic lens data will be shown in Table 2 below.

TABLE 2

Embodiment 2
Unit mm
f = 2.113
Fno = 2.414
ω = 37.31°

Surface data

| Surface No. i | Curvature radius r | Surface distance d | Refractive index Nd | Abbe No. vd |
|---|---|---|---|---|
| (Object surface) | Infinity | Infinity | | |
| Stop | Infinity | −0.03 | | |
| 1* | 1.53 | 0.583 | 1.534622 | 56.1603 |
| 2* | −1.4053 | 0.269 | | |
| 3* | −0.5542 | 0.27 | 1.635489 | 23.9114 |
| 4* | −1.1767 | 0.0483 | | |
| 5* | −6.3097 | 0.5193 | 1.534622 | 56.1603 |
| 6* | −0.4766 | 0.02 | | |
| 7* | −99.0084 | 0.3 | 1.534622 | 56.1603 |
| 8* | 0.524492 | 0.28 | | |
| 9 | Infinity | 0.3 | 1.514798 | 54.1983 |
| 10 | Infinity | 0.4272 | | |
| Image plane | Infinity | | | |

Single lens data

| Lens | Start surface | Focal length |
|---|---|---|
| 1 | 1 | 1.4675 |
| 2 | 3 | −1.9697 |
| 3 | 5 | 0.9323 |
| 4 | 7 | −0.9717 |

Aspheric data

| | First surface | Second surface | Third surface | Fourth surface |
|---|---|---|---|---|
| k | 0 | −21.8 | −0.34 | −2.2 |
| A4 | −2.260E−01 | −1.305E+00 | 7.278E−01 | 3.080E−02 |
| A6 | −8.538E−01 | 1.510E+00 | −2.477E+00 | 2.405E+00 |
| A8 | 2.592E+00 | −1.029E+00 | 3.497E+01 | −1.258E+01 |
| A10 | −1.406E+01 | −3.746E+00 | −1.082E+02 | 4.436E+01 |
| A12 | 0.000E+00 | 1.447E+00 | 1.227E+02 | −7.945E+01 |
| A14 | 0.000E+00 | 0.000E+00 | 0.000E+00 | 5.302E+01 |
| A16 | 0.000E+00 | 0.000E+00 | 0.000E+00 | 0.000E+00 |

| | Fifth surface | Sixth surface | Seventh surface | Eighth surface |
|---|---|---|---|---|
| k | 0 | −4.58 | 0 | −6.9 |
| A4 | −1.316E−01 | −5.276E−01 | −9.070E−02 | −4.632E−01 |
| A6 | 2.076E+00 | 2.673E+00 | −6.649E−01 | 9.046E−01 |
| A8 | −1.012E+01 | −7.614E+00 | 1.076E+00 | −1.792E+00 |
| A10 | 2.337E+01 | 1.217E+01 | −6.227E−01 | 2.298E+00 |
| A12 | −2.433E+01 | −7.864E+00 | 1.214E−01 | −1.758E+00 |
| A14 | 7.624E+00 | 3.477E−01 | 0.000E+00 | 7.230E−01 |
| A16 | 0.000E+00 | 9.708E−01 | 0.000E+00 | −1.242E−01 |

The image pickup lens according to Embodiment 2 satisfies all conditional expressions (1) through (7), as shown in Table 7.

Figure 4:
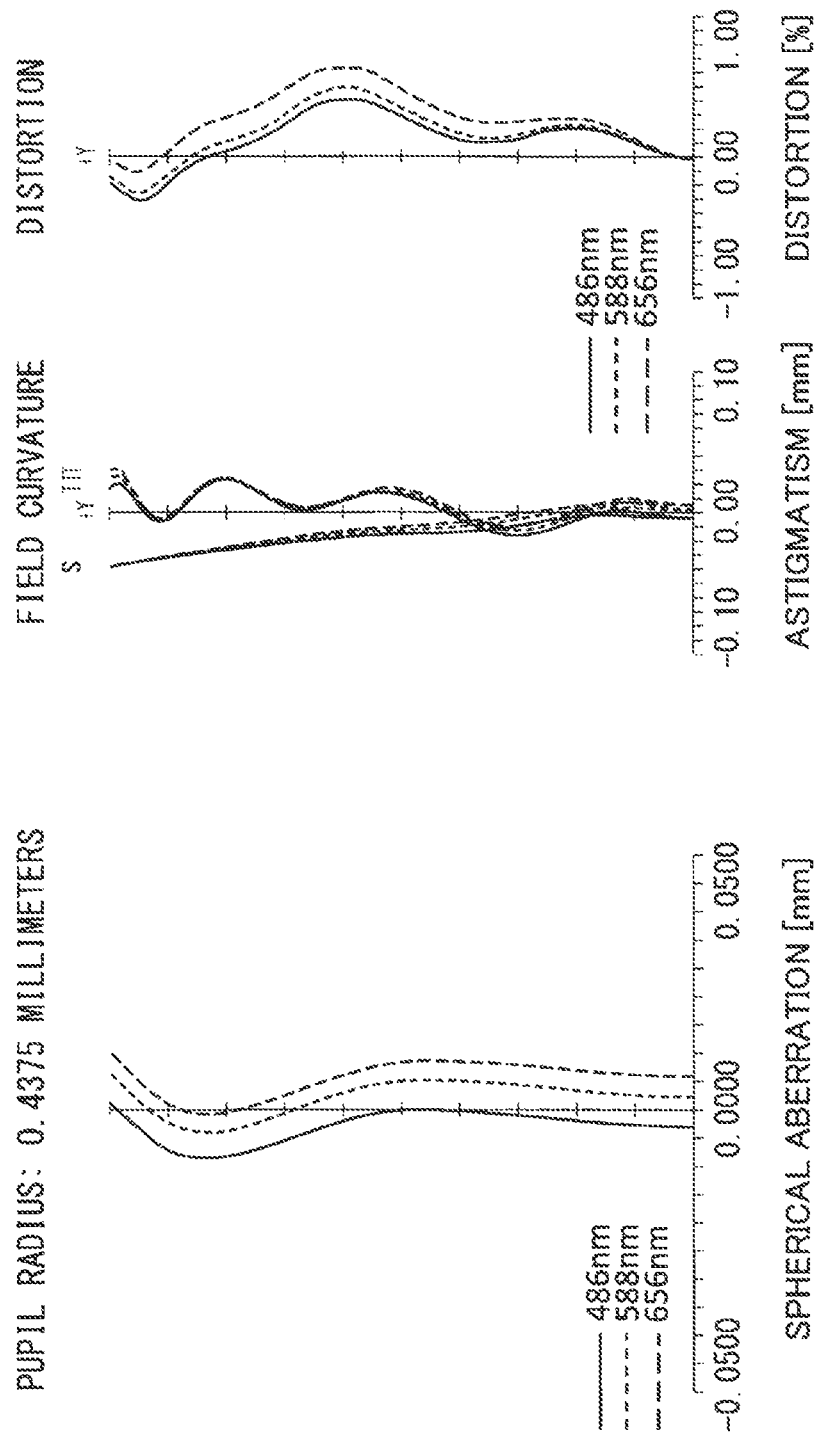
FIG. 4 is a view showing a spherical aberration, astigmatism, and a distortion of the image pickup lens according to Embodiment 2.
Figure 5:
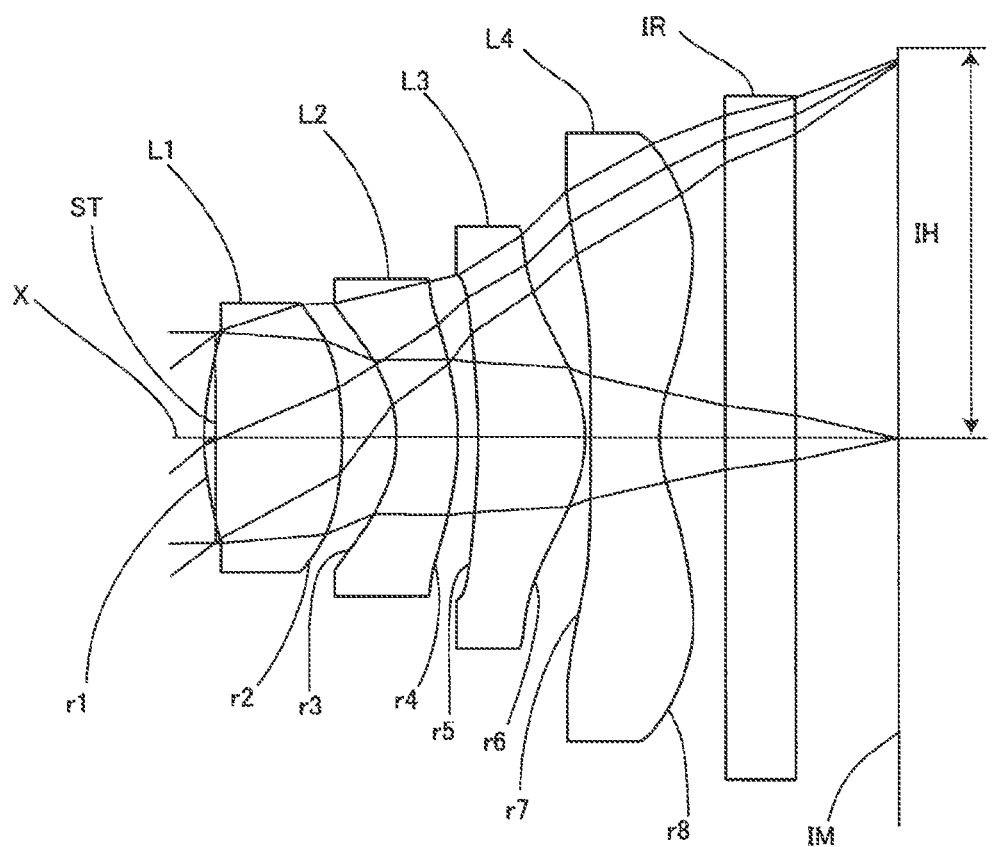
FIG. 5 is a view showing a general configuration of the image pickup lens according to Embodiment 3.

FIG. 4 shows a spherical aberration (mm), astigmatism (mm), and a distortion (%) of the image pickup lens according to Embodiment 2. These aberration diagrams illustrate the amount of aberration with respect to the respective wavelengths of F-ray (486 nm), d-ray (588 nm) and C-ray (656 nm). Further, the astigmatism diagram illustrates the respective amounts of aberration on a sagittal image surface S and a tangential image surface T. As shown in FIG. 4, it is observed that the respective aberrations are satisfactorily corrected.

Further, a ratio (TTL/2IH) of the total track length TTL to the maximum image height IH is 0.901, enabled realizing the downsizing. Moreover, while a half angle of field of the lens is 37.31°, a relatively wide angle of field, achieved a small distortion image, the maximum value of approximately 0.49%.

Embodiment 3

Basic lens data will be shown in Table 3 below.

TABLE 3

Embodiment 3
Unit mm
f = 2.158
Fno = 2.407
ω = 36.73°

Surface data

| Surface No. i | Curvature radius r | Surface distance d | Refractive index Nd | Abbe No. vd |
|---|---|---|---|---|
| (Object surface) | Infinity | Infinity | | |
| Stop | Infinity | −0.045 | | |
| 1* | 1.2676 | 0.587 | 1.534622 | 56.1603 |
| 2* | −1.8129 | 0.2324 | | |
| 3* | −0.5789 | 0.27 | 1.635489 | 23.9114 |
| 4* | −1.0863 | 0.0814 | | |
| 5* | −2.5675 | 0.4638 | 1.534622 | 56.1603 |
| 6* | −0.4705 | 0.02 | | |
| 7* | −100 | 0.3 | 1.534622 | 56.1603 |
| 8* | 0.5424 | 0.28 | | |
| 9 | Infinity | 0.3 | 1.514798 | 54.1983 |
| 10 | Infinity | 0.4747 | | |
| Image plane | Infinity | | | |

Single lens data

| Lens | Start surface | Focal length |
|---|---|---|
| 1 | 1 | 1.4900 |
| 2 | 3 | −2.4434 |
| 3 | 5 | 0.9971 |
| 4 | 7 | −1.0047 |

Aspheric data

| | First surface | Second surface | Third surface | Fourth surface |
|---|---|---|---|---|
| k | 0 | −41 | −0.3501 | −2.9019 |
| A4 | −2.135E−01 | −1.232E+00 | 2.837E−01 | 4.750E−02 |
| A6 | −1.939E−01 | 3.398E−01 | −3.272E+00 | 2.188E+00 |
| A8 | 5.075E−01 | 1.356E+00 | 3.821E+01 | −1.284E+01 |
| A10 | −1.176E+01 | −5.494E+00 | −1.100E+02 | 4.564E+01 |
| A12 | 0.000E+00 | 3.441E+00 | 1.208E+02 | −7.967E+01 |
| A14 | 0.000E+00 | 0.000E+00 | 0.000E+00 | 5.049E+01 |
| A16 | 0.000E+00 | 0.000E+00 | 0.000E+00 | 0.000E+00 |

| | Fifth surface | Sixth surface | Seventh surface | Eighth surface |
|---|---|---|---|---|
| k | 12.4393 | −4.4632 | 0 | −7.6648 |
| A4 | 3.463E−01 | −4.380E−01 | −2.850E−02 | −4.506E−01 |
| A6 | 1.515E+00 | 2.610E+00 | −6.764E−01 | 8.781E−01 |
| A8 | −9.376E+00 | −7.169E+00 | 1.052E+00 | −1.748E+00 |
| A10 | 2.296E+01 | 1.207E+01 | −4.537E−01 | 2.258E+00 |
| A12 | −2.591E+01 | −8.519E+00 | 2.230E−02 | −1.741E+00 |
| A14 | 1.201E+01 | −2.458E−01 | 0.000E+00 | 7.191E−01 |
| A16 | −3.600E+00 | 1.742E+00 | 0.000E+00 | −1.215E−01 |

The image pickup lens according to Embodiment 3 satisfies all conditional expressions (1) through (7), as shown in Table 7.

Figure 6:
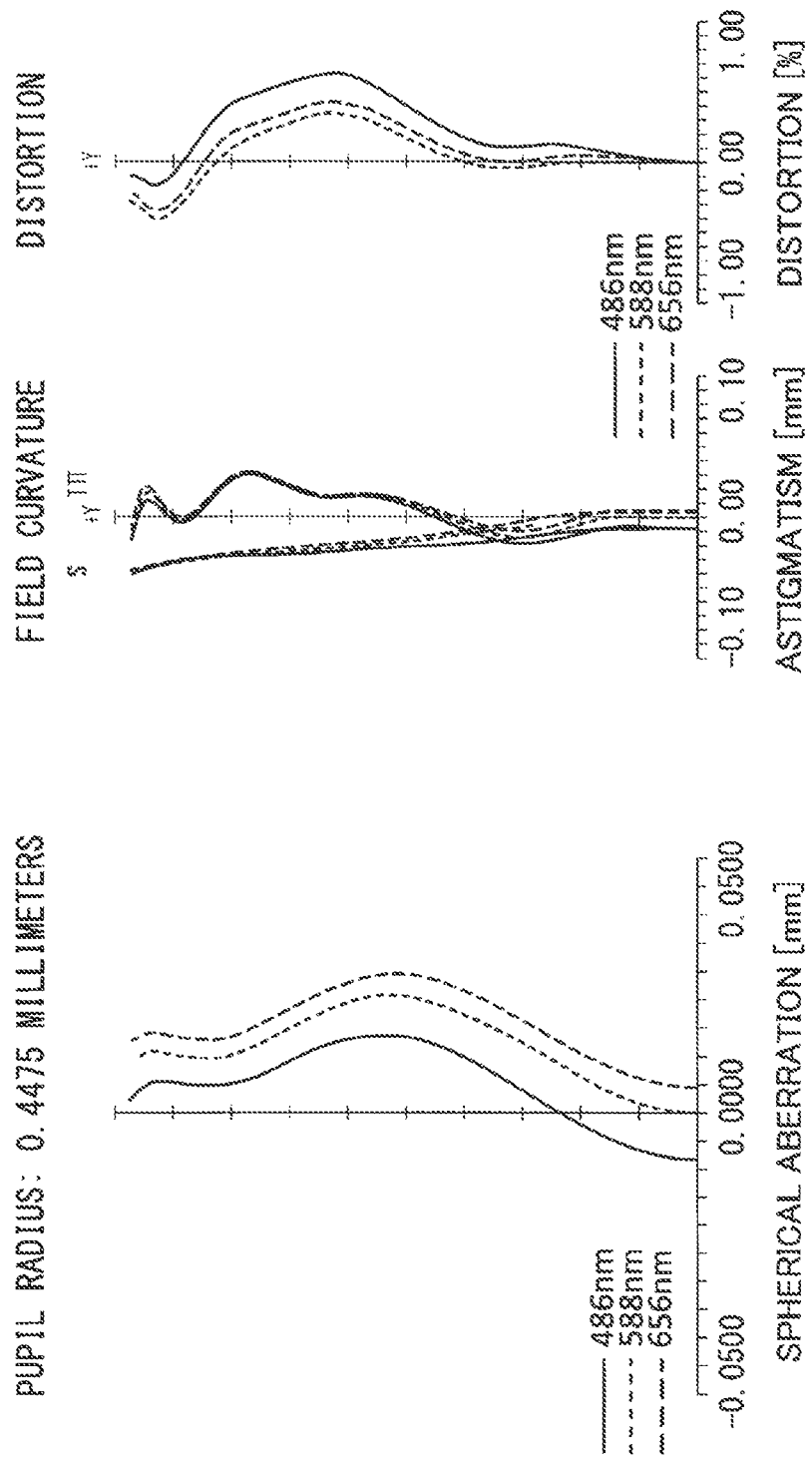
FIG. 6 is a view showing a spherical aberration, astigmatism, and a distortion of the image pickup lens according to Embodiment 3.
Figure 7:
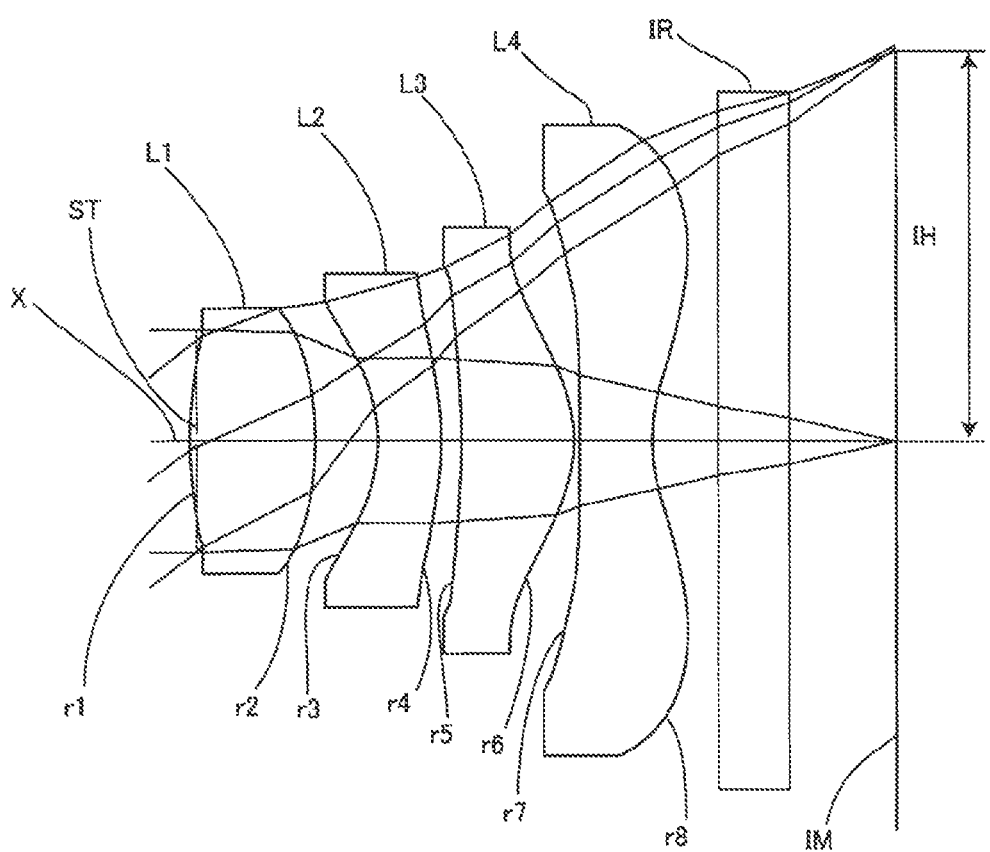
FIG. 7 is a view showing a general configuration of the image pickup lens according to Embodiment 4.

FIG. 6 shows a spherical aberration (mm), astigmatism (mm), and a distortion (%) of the image pickup lens according to Embodiment 3. These aberration diagrams illustrate the amount of aberration with respect to the respective wavelengths of F-ray (486 nm), d-ray (588 nm) and C-ray (656 nm). Further, the astigmatism diagram illustrates the respective amounts of aberration on a sagittal image surface S and a tangential image surface T. As shown in FIG. 6, it is observed that the respective aberrations are satisfactorily corrected.

Further, a ratio (TTL/2IH) of the total track length TTL to the maximum image height IH is 0.891, enabled realizing the downsizing. Moreover, while a half angle of field of the lens is 36.73°, a relatively wide angle of field, achieved a small distortion image, the maximum value of approximately −0.5%.

Embodiment 4

Basic lens data will be shown in Table 4 below.

TABLE 4

Embodiment 4
Unit mm
f = 2.167
Fno = 2.407
ω = 36.61°

Surface data

| Surface No. i | Curvature radius r | Surface distance d | Refractive index Nd | Abbe No. vd |
|---|---|---|---|---|
| (Object surface) | Infinity | Infinity | | |
| Stop | Infinity | −0.03 | | |
| 1* | 1.4652 | 0.5314 | 1.534622 | 56.1603 |
| 2* | −1.5354 | 0.2651 | | |
| 3* | −0.6107 | 0.2718 | 1.635489 | 23.9114 |
| 4* | −1.2008 | 0.08425 | | |
| 5* | −2.6561 | 0.4805 | 1.534622 | 56.1603 |
| 6* | −0.4672 | 0.02 | | |
| 7* | −45 | 0.3085 | 1.534622 | 56.1603 |
| 8* | 0.5368 | 0.28 | | |
| 9 | Infinity | 0.3 | 1.514798 | 54.1983 |
| 10 | Infinity | 0.4465 | | |
| Image Plane | Infinity | | | |

Single lens data

| Lens | Start surface | Focal length |
|---|---|---|
| 1 | 1 | 1.4900 |
| 2 | 3 | −2.3671 |
| 3 | 5 | 0.9818 |
| 4 | 7 | −0.9867 |

Aspheric data

| | First surface | Second surface | Third surface | Fourth surface |
|---|---|---|---|---|
| k | 0 | −20 | −0.34 | −4.27 |
| A4 | −3.043E−01 | −1.158E+00 | 4.918E−01 | 0.000E+00 |
| A6 | −2.113E−01 | 2.789E−01 | −3.253E+00 | 3.970E−02 |
| A8 | −8.214E−01 | 2.633E+00 | 3.719E+01 | 2.099E+00 |
| A10 | −1.151E+01 | −1.003E+01 | −1.112E+02 | −1.264E+01 |
| A12 | 0.000E+00 | 3.441E+00 | 1.208E+02 | 4.592E+01 |
| A14 | 0.000E+00 | 0.000E+00 | 0.000E+00 | −8.025E+01 |
| A16 | 0.000E+00 | 0.000E+00 | 0.000E+00 | 5.049E+01 |

| | Fifth surface | Sixth surface | Seventh surface | Eighth surface |
|---|---|---|---|---|
| k | 12.5 | −4.3 | 0 | −7.2 |
| A4 | 2.199E−01 | −4.861E−01 | −1.540E−02 | −4.417E−01 |
| A6 | 1.786E+00 | 2.611E+00 | −7.065E−01 | 8.557E−01 |
| A8 | −9.466E+00 | −7.061E+00 | 1.083E+00 | −1.721E+00 |
| A10 | 2.250E+01 | 1.208E+01 | −5.021E−01 | 2.236E+00 |
| A12 | −2.475E+01 | −8.574E+00 | −7.264E−03 | −1.736E+00 |
| A14 | 1.201E+01 | −3.735E−01 | 1.640E−02 | 7.277E−01 |
| A16 | −3.600E+00 | 1.931E+00 | 0.000E+00 | −1.278E−01 |

The image pickup lens according to Embodiment 4 satisfies all conditional expressions (1) through (7), as shown in Table 7.

Figure 8:
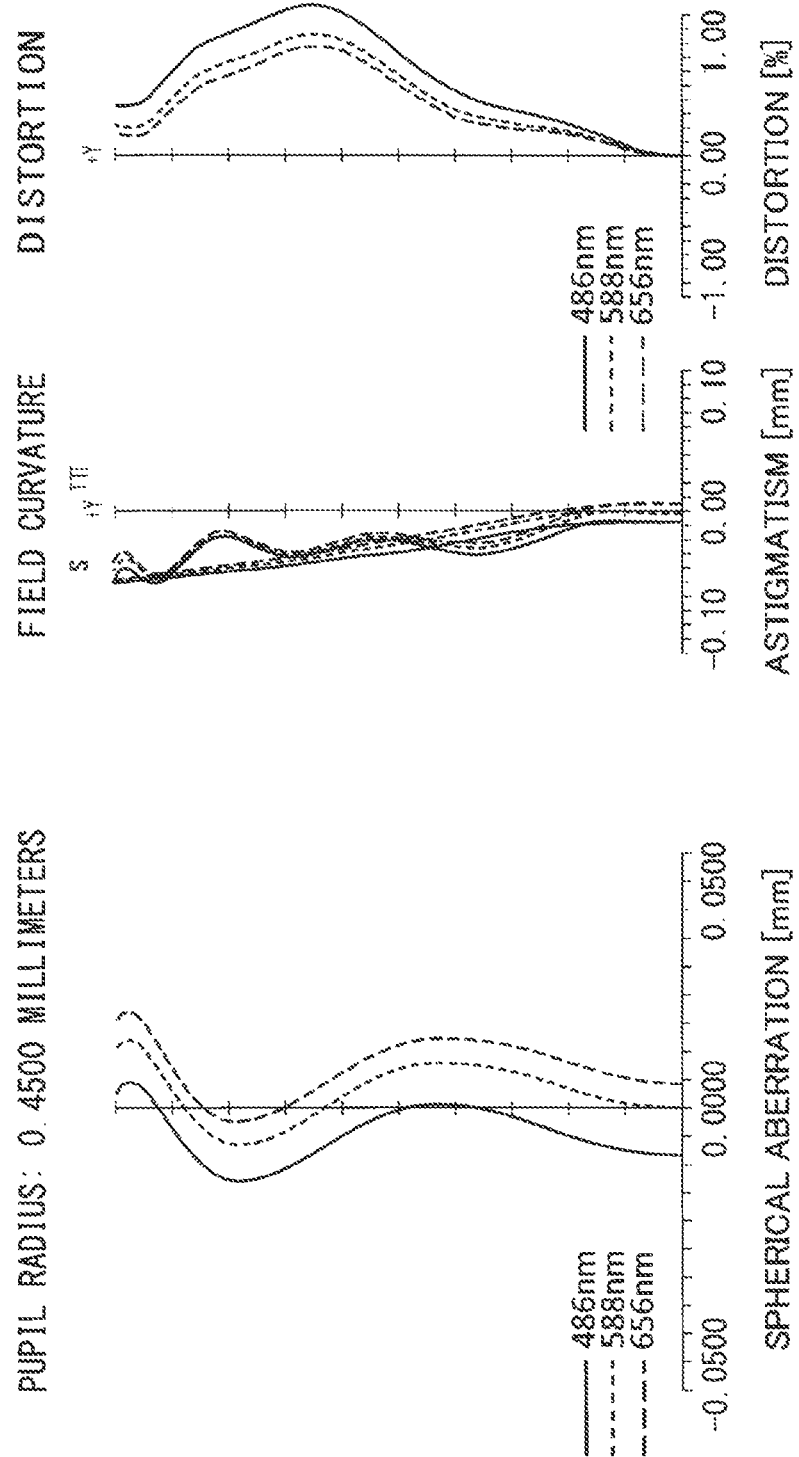
FIG. 8 is a view showing a spherical aberration, astigmatism, and a distortion of the image pickup lens according to Embodiment 4.
Figure 9:
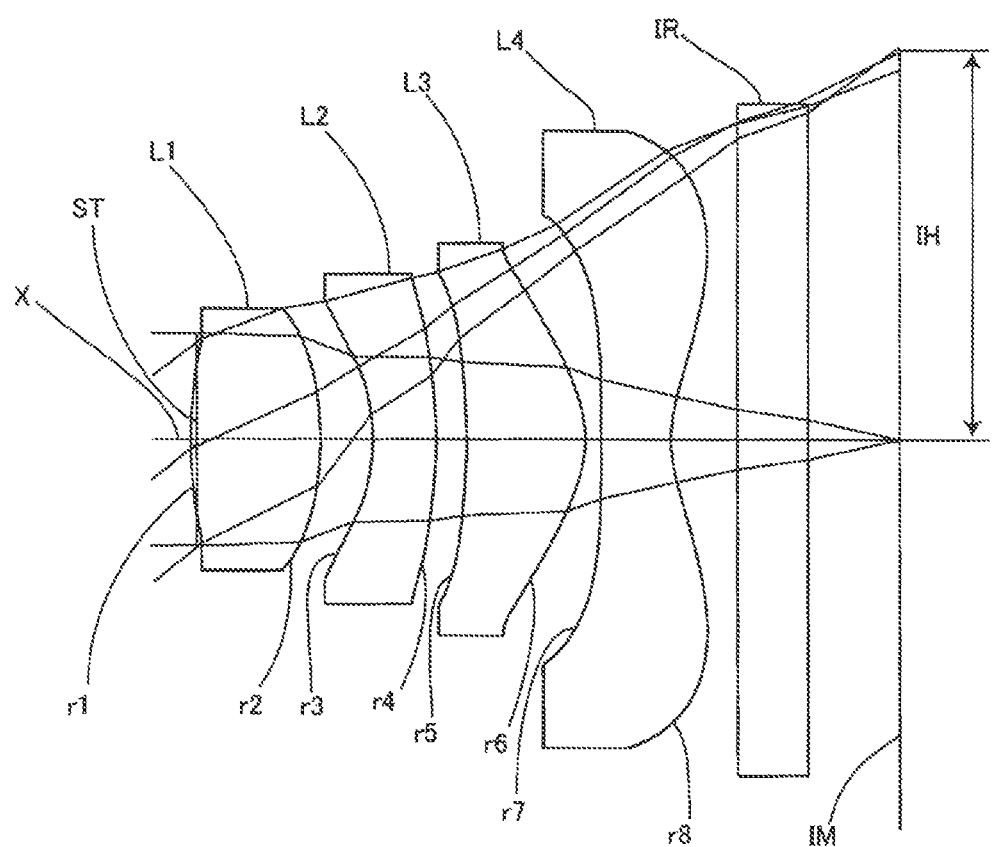
FIG. 9 is a view showing a general configuration of the image pickup lens according to Embodiment 5.

FIG. 8 shows a spherical aberration (mm), astigmatism (mm), and a distortion (%) of the image pickup lens according to Embodiment 4. These aberration diagrams illustrate the amount of aberration with respect to the respective wavelengths of F-ray (486 nm), d-ray (588 nm) and C-ray (656 nm). Further, the astigmatism diagram illustrates the respective amounts of aberration on a sagittal image surface S and a tangential image surface T. As shown in FIG. 8, it is observed that the respective aberrations are satisfactorily corrected.

Further, a ratio (TTL/2IH) of the total track length TTL to the maximum image height IH is 0.896, enabled realizing the downsizing. Moreover, while a half angle of field of the lens is 36.61°, a relatively wide angle of field, achieved a small distortion image, the maximum value of approximately 0.44%.

Embodiment 5

Basic lens data will be shown in Table 5 below.

TABLE 5

Embodiment 5
Unit mm
f = 2.146
Fno = 2.438
ω = 36.88°

Surface data

| Surface No. i | Curvature radius r | Surface distance d | Refractive index Nd | Abbe No. vd |
|---|---|---|---|---|
| (Object surface) | Infinity | Infinity | | |
| Stop | Infinity | −0.0275 | | |
| 1* | 1.6 | 0.5508 | 1.534622 | 56.1603 |
| 2* | −1.3657 | 0.2228 | | |
| 3* | −0.7623 | 0.27 | 1.635489 | 23.9114 |
| 4* | −2.0766 | 0.1294 | | |
| 5* | −3.1254 | 0.5052 | 1.534622 | 56.1603 |
| 6* | −0.5 | 0.0675 | | |
| 7* | −93 | 0.3 | 1.534622 | 56.1603 |
| 8* | 0.5806 | 0.28 | | |
| 9 | Infinity | 0.3 | 1.514798 | 54.1983 |
| 10 | Infinity | 0.3850 | | |
| Image plane | Infinity | | | |

Single lens data

| Lens | Start surface | Focal length |
|---|---|---|
| 1 | 1 | 1.4690 |
| 2 | 3 | −2.0452 |
| 3 | 5 | 1.0399 |
| 4 | 7 | −1.0745 |

Aspheric data

| | First surface | Second surface | Third surface | Fourth surface |
|---|---|---|---|---|
| k | −0.95 | −10.4 | 0.2 | −5.5 |
| A4 | −2.783E−01 | −9.113E−01 | 3.014E−01 | −1.202E−01 |
| A6 | 9.745E−02 | −5.991E−01 | −3.798E+00 | 1.627E+00 |
| A8 | −3.178E+00 | 5.714E+00 | 3.832E+01 | −1.240E+01 |
| A10 | −2.582E+00 | −1.313E+01 | −1.103E+02 | 4.647E+01 |
| A12 | 0.000E+00 | 4.448E+00 | 1.210E+02 | −8.021E+01 |
| A14 | 0.000E+00 | 0.000E+00 | 0.000E+00 | 5.040E+01 |
| A16 | 0.000E+00 | 0.000E+00 | 0.000E+00 | 0.000E+00 |

| | Fifth surface | Sixth surface | Seventh surface | Eighth surface |
|---|---|---|---|---|
| k | 14.2 | −3.83 | 0 | −6.2 |
| A4 | −8.860E−02 | −5.646E−01 | −1.390E−01 | −5.009E−01 |
| A6 | 1.798E+00 | 2.368E+00 | −7.682E−01 | 8.970E−01 |
| A8 | −1.046E+01 | −7.006E+00 | 1.447E+00 | −1.664E+00 |
| A10 | 2.359E+01 | 1.201E+01 | −9.301E−01 | 2.156E+00 |
| A12 | −2.476E+01 | −8.972E+00 | 0.000E+00 | −1.730E+00 |
| A14 | 1.219E+01 | −3.039E−01 | 0.000E+00 | 7.515E−01 |
| A16 | −3.280E+00 | 3.857E+00 | 0.000E+00 | −1.367E−01 |

The image pickup lens according to Embodiment 5 satisfies all conditional expressions (1) through (7), as shown in Table 7.

Figure 10:
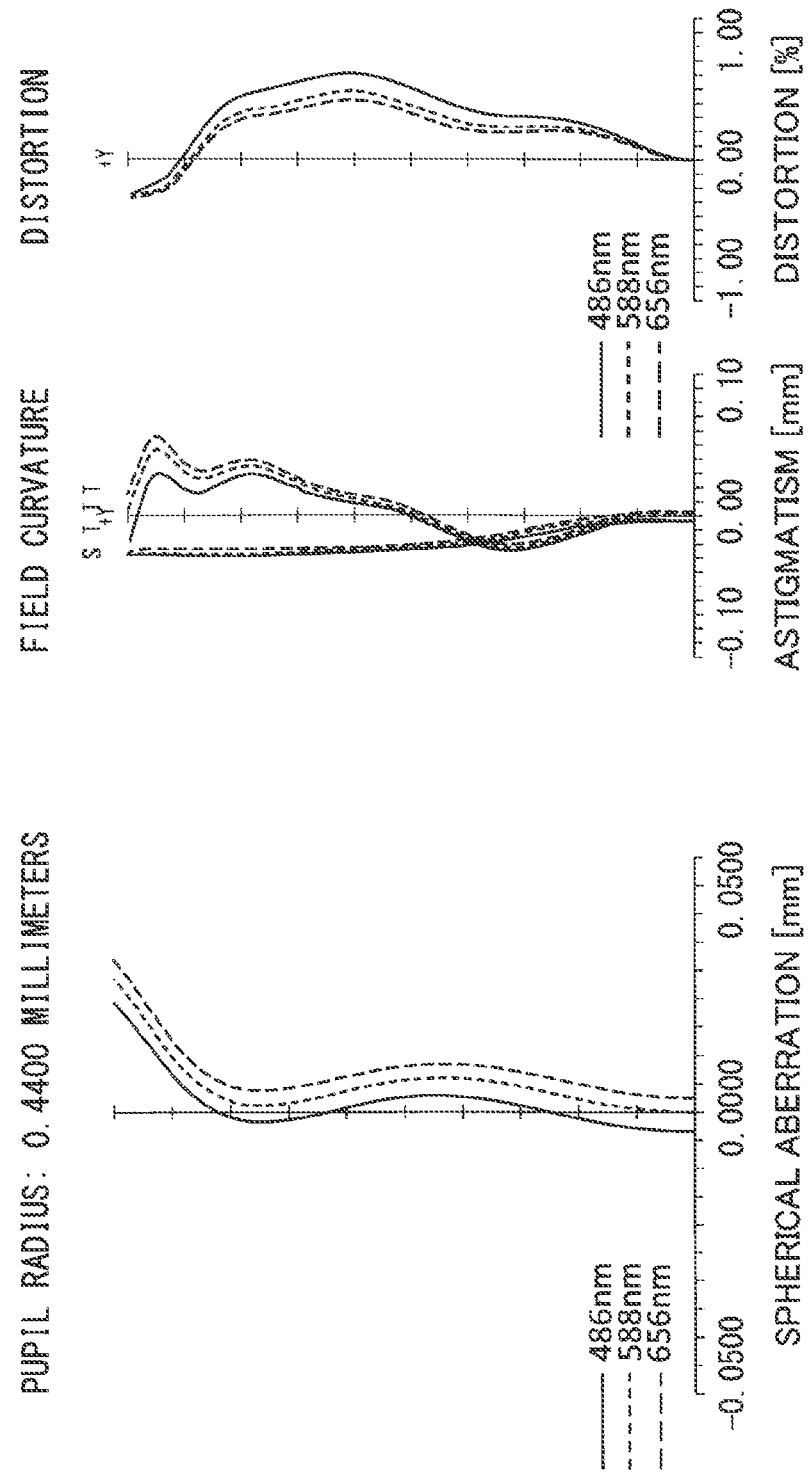
FIG. 10 is a view showing a spherical aberration, astigmatism, and a distortion of the image pickup lens according to Embodiment 5.
Figure 11:
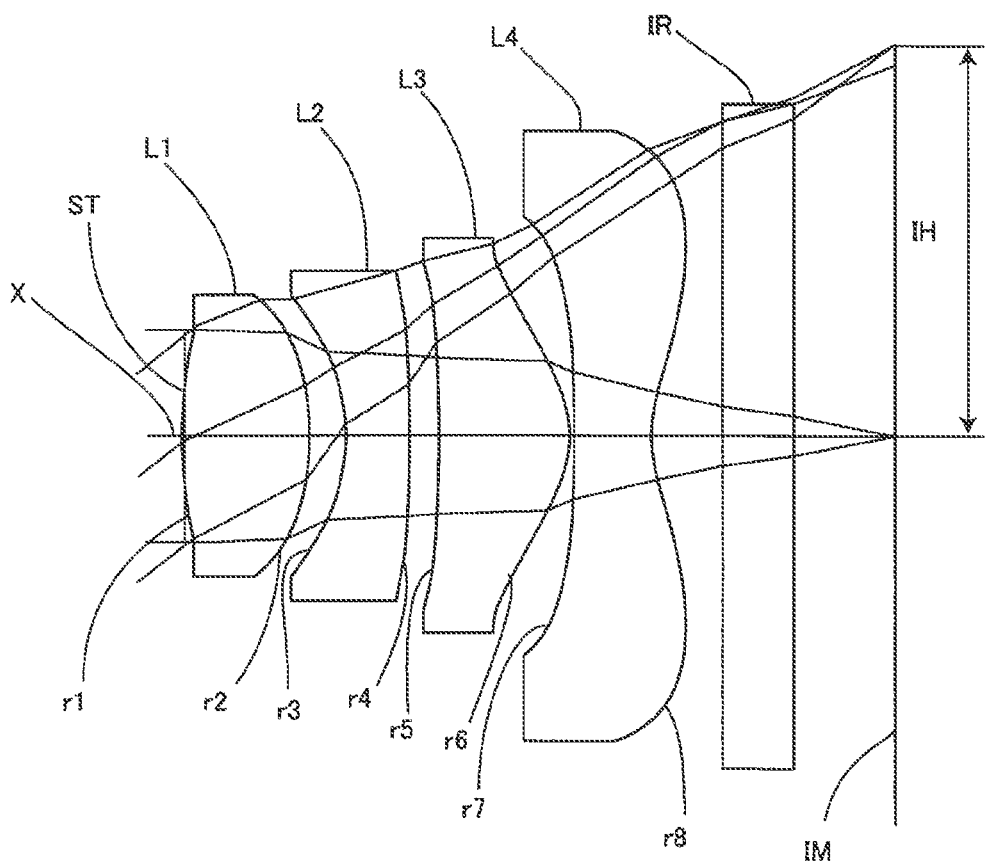
FIG. 11 is a view showing a general configuration of the image pickup lens according to Embodiment 6.

FIG. 10 shows a spherical aberration (mm), astigmatism (mm), and a distortion (%) of the image pickup lens according to Embodiment 5. These aberration diagrams illustrate the amount of aberration with respect to the respective wavelengths of F-ray (486 nm), d-ray (588 nm) and C-ray (656 nm). Further, the astigmatism diagram illustrates the respective amounts of aberration on a sagittal image surface S and a tangential image surface T. As shown in FIG. 10, it is observed that the respective aberrations are satisfactorily corrected.

Further, a ratio (TTL/2IH) of the total track length TTL to the maximum image height IH is 0.903, enabled realizing the downsizing. Moreover, while a half angle of field of the lens is 36.88°, a relatively wide angle of field, achieved a small distortion image, the maximum value of approximately −0.57%.

Embodiment 6

Basic lens data will be shown in Table 6 below.

TABLE 6

Embodiment 6
Unit mm
f = 2.121
Fno = 2.41
ω = 37.20°

Surface data

| Surface No. i | Curvature radius r | Surface distance d | Refractive index Nd | Abbe No. vd |
|---|---|---|---|---|
| (Object surface) | Infinity | Infinity | | |
| Stop | Infinity | −0.00776751 | | |
| 1* | 1.469 | 0.542 | 1.534622 | 56.1603 |
| 2* | −1.3409 | 0.155 | | |
| 3* | −0.8873 | 0.27 | 1.61422 | 25.5765 |
| 4* | −11.4478 | 0.127 | | |
| 5* | −4.8349 | 0.552 | 1.544135 | 55.9763 |
| 6* | −0.4297 | 0.02 | | |
| 7* | −5.4294 | 0.329 | 1.534622 | 56.1603 |
| 8* | 0.5369 | 0.3 | | |
| 9 | Infinity | 0.3 | 1.514798 | 54.1983 |
| 10 | Infinity | 0.4077 | | |
| Image plane | Infinity | | | |

Single lens data

| Lens | Start surface | Focal length |
|---|---|---|
| 1 | 1 | 1.3989 |
| 2 | 3 | −1.5670 |
| 3 | 5 | 0.8264 |
| 4 | 7 | −0.8921 |

Aspheric data

| | First surface | Second surface | Third surface | Fourth surface |
|---|---|---|---|---|
| k | −2.2 | −2.55 | 0.01 | −390 |
| A4 | −2.873E−01 | −8.582E−01 | −4.147E−01 | −2.207E−01 |
| A6 | 2.697E+00 | −3.020E−01 | −4.136E+00 | 1.190E+00 |
| A8 | −3.011E+01 | 8.824E−01 | 3.707E+01 | −1.235E+01 |
| A10 | 1.165E+02 | −3.917E+00 | −1.071E+02 | 4.705E+01 |
| A12 | −2.258E+02 | −4.250E+00 | 1.218E+02 | −7.913E+01 |
| A14 | 0.000E+00 | 0.000E+00 | 0.000E+00 | 5.133E+01 |
| A16 | 0.000E+00 | 0.000E+00 | 0.000E+00 | 0.000E+00 |

| | Fifth surface | Sixth surface | Seventh surface | Eighth surface |
|---|---|---|---|---|
| k | −155 | −3.9 | 0 | −7.7 |
| A4 | −8.230E−02 | −7.161E−01 | 1.020E−01 | −4.491E−01 |
| A6 | 1.543E+00 | 2.924E+00 | −1.271E+00 | 7.841E−01 |
| A8 | −1.018E+01 | −6.898E+00 | 2.453E+00 | −1.530E+00 |
| A10 | 2.321E+01 | 1.146E+01 | −1.681E+00 | 2.141E+00 |
| A12 | −2.487E+01 | −9.341E+00 | 0.000E+00 | −1.815E+00 |
| A14 | 1.277E+01 | −3.481E+00 | 0.000E+00 | 8.120E−01 |
| A16 | −4.992E−01 | 4.531E+00 | 0.000E+00 | −1.503E−01 |

The image pickup lens according to Embodiment 6 satisfies all conditional expressions (1) through (7), as shown in Table 7.

Figure 12:
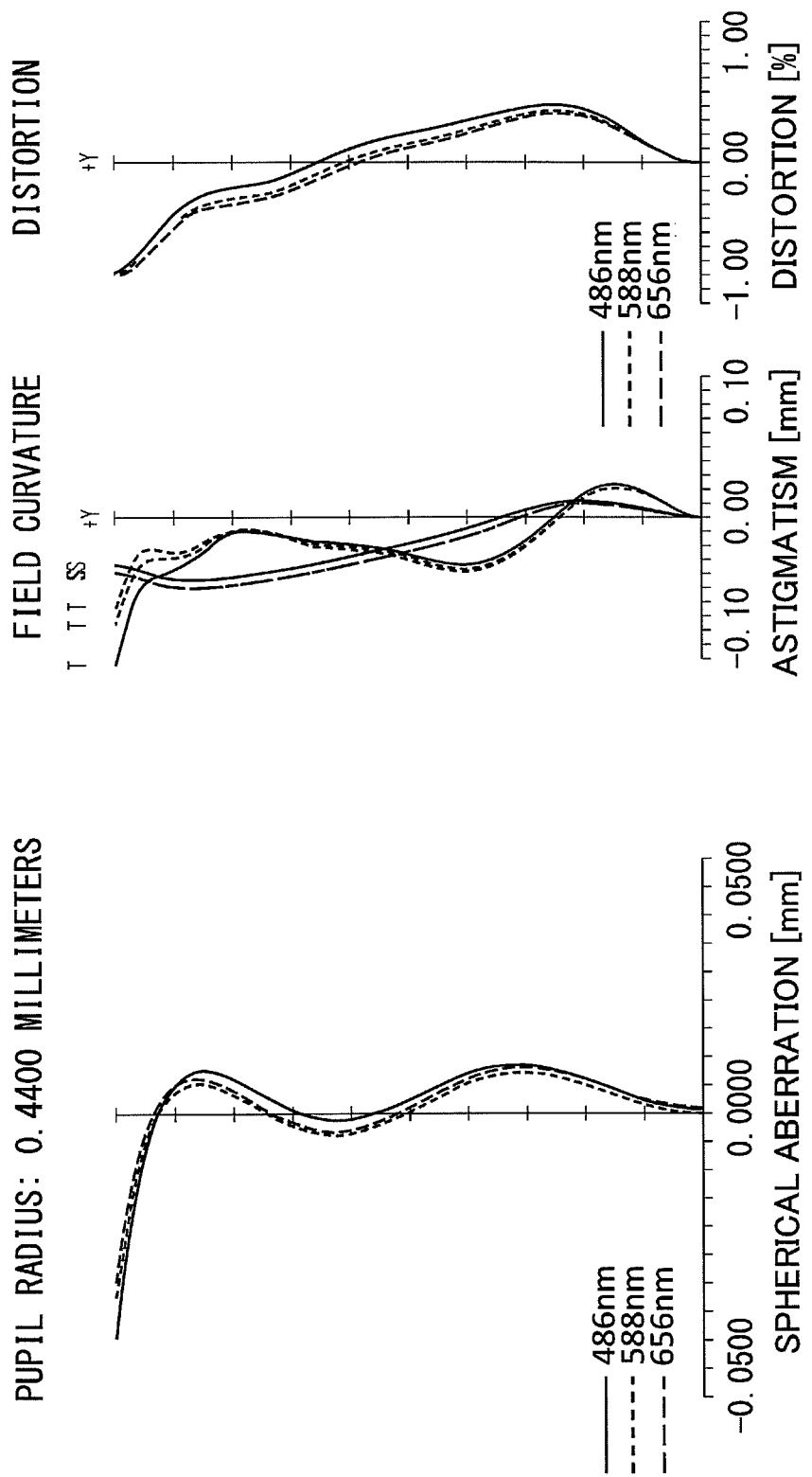
FIG. 12 is a view showing a spherical aberration, astigmatism, and a distortion of the image pickup lens according to Embodiment 6.

FIG. 12 shows a spherical aberration (mm), astigmatism (mm), and a distortion (%) of the image pickup lens according to Embodiment 6. These aberration diagrams illustrate the amount of aberration with respect to the respective wavelengths of F-ray (486 nm), d-ray (588 nm) and C-ray (656 nm). Further, the astigmatism diagram illustrates the respective amounts of aberration on a sagittal image surface S and a tangential image surface T. As shown in FIG. 12, it is observed that the respective aberrations are satisfactorily corrected.

Further, a ratio (TTL/2IH) of the total track length TTL to the maximum image height IH is 0.907, enabled realizing downsizing. Moreover, while a half angle of field of the lens is 37.20°, a relatively wide angle of field, achieved a small distortion image, the maximum value of approximately −1.58%.

Table 7 shows the values of respective parameters according to Embodiments 1 through 6 and the values of conditional expressions (1) through (7).

TABLE 7

|  |  | Embodiment 1 | Embodiment 2 | Embodiment 3 | Embodiment 4 | Embodiment 5 | Embodiment 6 |
|---|---|---|---|---|---|---|---|
|  | f | 2.143 | 2.113 | 2.158 | 2.167 | 2.146 | 2.121 |
|  | f1 | 1.479 | 1.467 | 1.490 | 1.490 | 1.469 | 1.399 |
|  | f2 | −1.922 | −1.970 | −2.443 | −2.367 | −2.045 | −1.567 |
|  | f3 | 0.999 | 0.932 | 0.997 | 0.982 | 1.040 | 0.826 |
|  | f4 | −1.053 | −0.972 | −1.005 | −0.987 | −1.075 | −0.892 |
| Bf (Distance calculated through air) |  | 0.878 | 0.890 | 0.914 | 0.923 | 0.863 | 0.927 |
| TTL (Distance calculated through air) |  | 2.892 | 2.900 | 2.869 | 2.885 | 2.908 | 2.922 |
|  | IH | 1.610 | 1.610 | 1.610 | 1.610 | 1.610 | 1.610 |
|  | Fno | 2.408 | 2.414 | 2.411 | 2.407 | 2.438 | 2.410 |
|  | ω(°) | 36.91 | 37.31 | 36.73 | 36.61 | 36.88 | 37.20 |
|  | EP | 0.890 | 0.875 | 0.895 | 0.900 | 0.880 | 0.880 |
| Conditional Expressions |  |  |  |  |  |  |  |
| (1) | f1/f | 0.690 | 0.695 | 0.690 | 0.688 | 0.685 | 0.659 |
| (2) | f3 < f1 | 0.999 < 1.479 | 0.932 < 1.467 | 0.997 < 1.490 | 0.982 < 1.490 | 1.040 < 1.469 | 0.826 < 1.399 |
| (3) | f3/|f4| | 0.949 | 0.959 | 0.992 | 0.995 | 0.968 | 0.926 |
| (4) | |f2|/f | 0.897 | 0.932 | 1.132 | 1.093 | 0.953 | 0.739 |
| (5) | Bf/TTL | 0.303 | 0.307 | 0.319 | 0.320 | 0.297 | 0.317 |
| (6) | IH/f | 0.751 | 0.762 | 0.746 | 0.743 | 0.750 | 0.759 |
| (7) | f/EP | 2.408 | 2.414 | 2.411 | 2.407 | 2.438 | 2.410 |
|  | TTL/2IH | 0.898 | 0.901 | 0.891 | 0.896 | 0.903 | 0.907 |
| Maximum value of distortion |  | 0.50 | 0.49 | −0.50 | 0.44 | −0.57 | −1.58 |

As shown in Table 7, the image pickup lenses according to the embodiments of the present invention satisfy all the conditional expressions (1) through (7).

The respective image pickup lenses according to the embodiments of the present invention have a half angle of field ω of approximately 37°, which enables to capture a relatively wide angle of field, and simultaneously realizes both securing of a wide angle of field and sufficient back focus, and further realizes a wide angle of field and favorable correction of aberration (especially distortion) at the same instant.

Industrial Applicability

As described, by applying the image pickup lens according to the respective embodiments of the present invention to the optical systems built into image pickup devices mounted on portable terminals such as cellular phones and smartphones, PDAs (Personal Digital Assistance), and game machines, both enhanced performance and downsizing of the camera are able to be achieved.

The effects of the present invention are as follows. According to the present invention, an image pickup lens where various aberrations are corrected preferably, matched to realize downsizing and thinning, achieving a relatively wide angle of field and bright lens.

Further, by forming all the lenses using plastic material, an image pickup lens suitable for mass production achievable for costs reduction.

What is claimed is:

1. An image pickup lens comprising, in order from an object side to an image plane side:
   an aperture stop;
   a first lens of a biconvex shape having a positive refractive power with convex surfaces facing both the object side and the image side near an optical axis;
   a second lens of a meniscus shape having a negative refractive power with a concave surface facing the object side near the optical axis;
   a third lens of a meniscus shape having a positive refractive power with a concave surface facing the object side near the optical axis; and
   a fourth lens of a biconcave shape having a negative refractive power with concave surfaces facing both the object side and the image side near the optical axis;
   wherein the image pickup lens satisfies following conditional expressions (1) and (4):

$$0.6 < f1/f < 0.8 \quad (1)$$

$$0.7 < |f2|/f < 1.2 \quad (4)$$

where f1 represents a focal length of the first lens, f2 represents a focal length of the second lens, and f represents a focal length of an overall optical system of the image pickup lens, and wherein none of the first lens, the second lens, the third lens, and the fourth lens are in contact with each other.

2. The image pickup lens according to claim 1, satisfying a following conditional expression (5):

$$0.28 < Bf/TTL < 0.35 \quad (5)$$

where Bf represents a distance on an optical axis from an image plane side of the fourth lens to the image plane (distance calculated through air), and TTL represents a distance on an optical axis from an object side surface of the first lens to the image plane (distance calculated through air).

3. The image pickup lens according to claim 1, satisfying a following conditional expression (6):

$$0.7 < IH/f < 0.80 \quad (6)$$

where IH represents a maximum image height.

4. The image pickup lens according to claim 1, satisfying following conditional expressions (2) and (3):

$$f3 < f1 \quad (2)$$

$$0.9 < |f3/f4| < 1.10 \quad (3)$$

where f3 represents a focal length of the third lens, and f4 represents a focal length of the fourth lens.

5. The image pickup lens according to claim 4, satisfying a following conditional expression (5):

$$0.28 < Bf/TTL < 0.35 \quad (5)$$

where Bf represents a distance on an optical axis from an image plane side of the fourth lens to the image plane (distance calculated through air), and TTL represents a distance on an optical axis from an object side surface of the first lens to the image plane (distance calculated through air).

6. The image pickup lens according to claim 4, satisfying a following conditional expression (6):

$$0.7 < IH/f < 0.80 \quad (6)$$

where IH represents a maximum image height.

* * * * *